Nov. 28, 1961 A. BRANDT 3,011,118
APPARATUS FOR AUTOMATIC REGULATION OF
CURRENT IN CONTACT CONVERTERS
Filed April 7, 1958 2 Sheets-Sheet 1
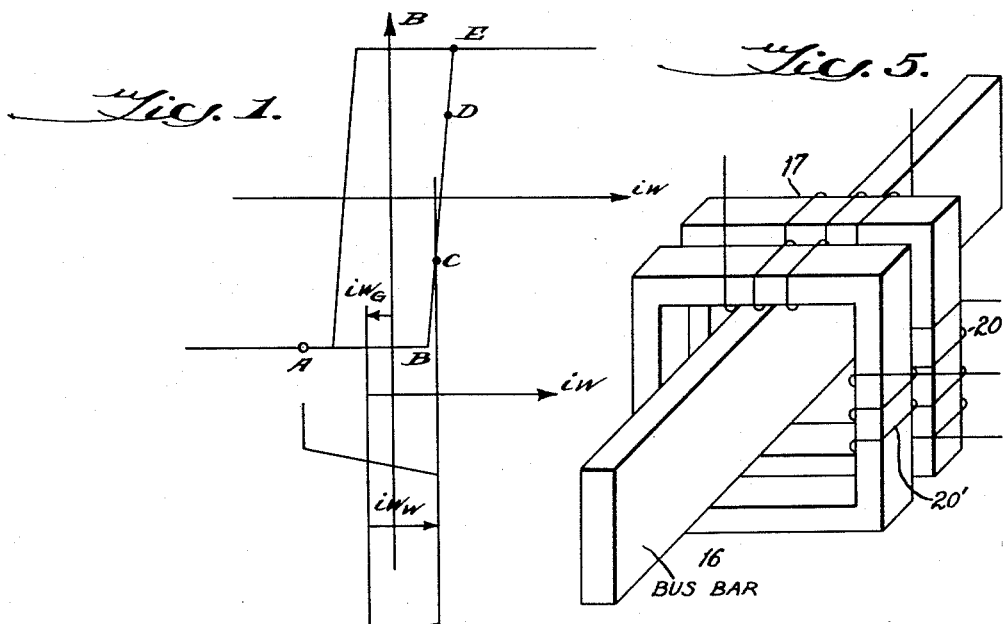
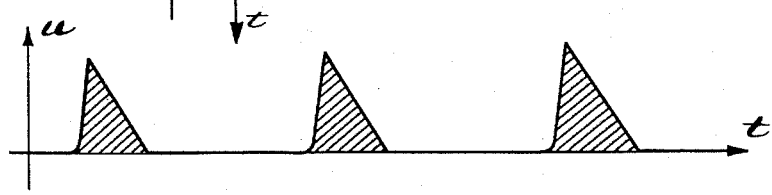
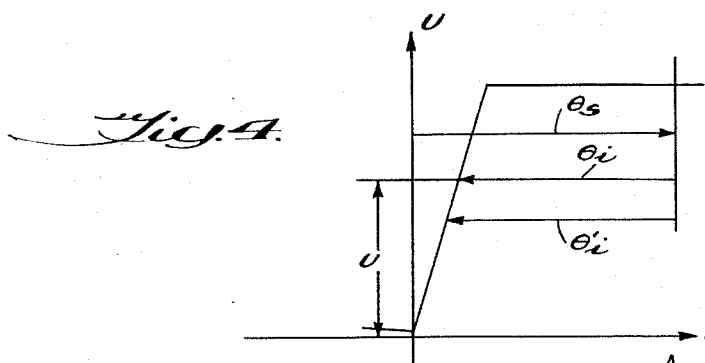
INVENTOR
Armand Brandt
BY Pierce, Scheffler & Parker
ATTORNEYS

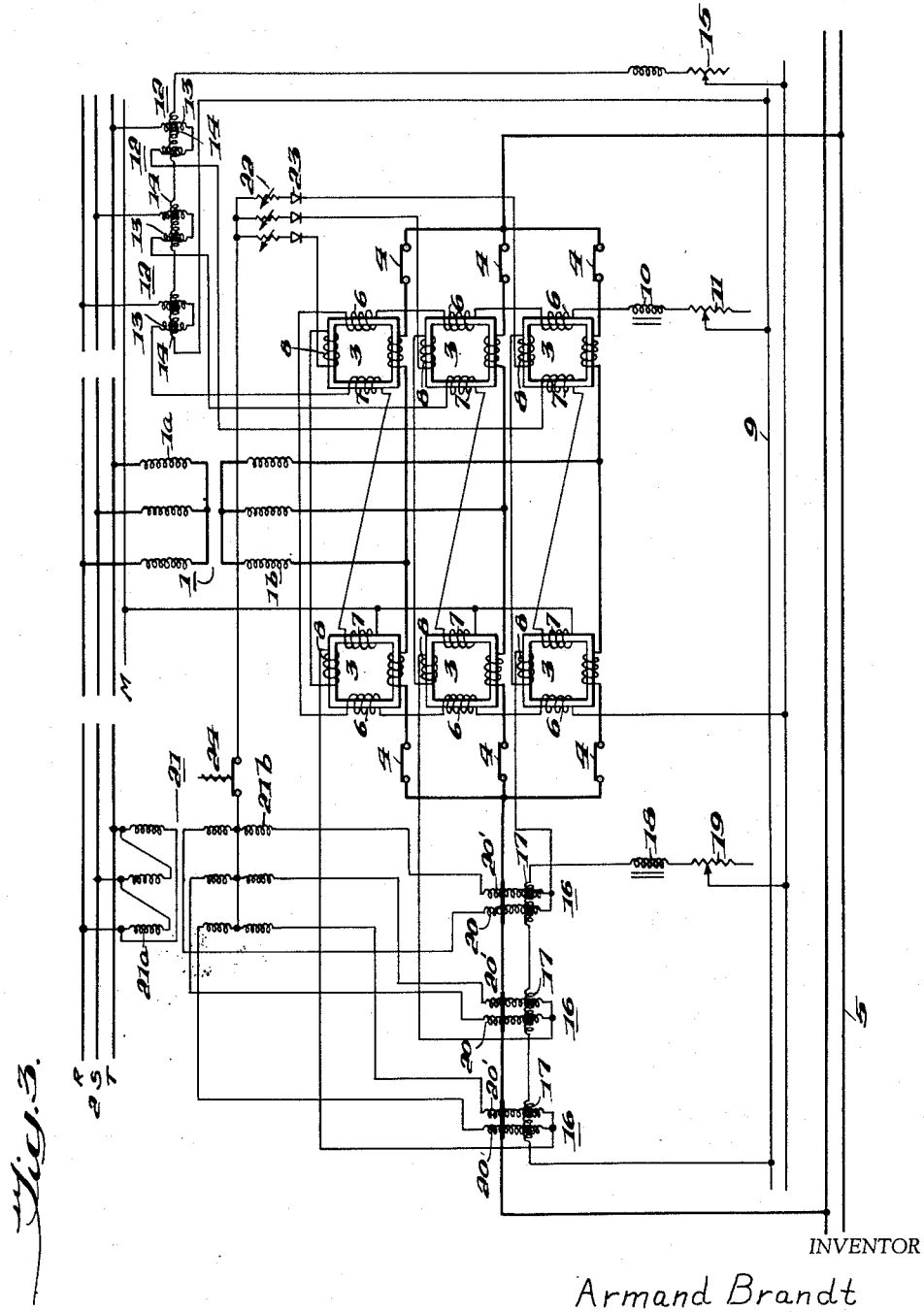

United States Patent Office 3,011,118
Patented Nov. 28, 1961

3,011,118
APPARATUS FOR AUTOMATIC REGULATION
OF CURRENT IN CONTACT CONVERTERS
Armand Brandt, Wettingen, Switzerland, assignor to Aktiengesellschaft Brown, Boveri & Cie, Baden, Switzerland, a company of Switzerland
Filed Apr. 7, 1958, Ser. No. 726,690
Claims priority, application Switzerland Apr. 8, 1957
3 Claims. (Cl. 321—48)

The present invention relates to electrical converter apparatus for converting alternating current into direct current to supply a direct current load and more particularly to such apparatus wherein the conversion from alternating to direct current is effected by means of contacts arranged between the two systems which are operated to opened and closed positions in synchronism with the cyclic change in the alternating current. This type of apparatus is commonly known as a contact converter.

Contact converters are equipped, as a rule, with an automatic regulation to constant direct current so that the load distribution in parallelly operating groups is ensured at all times. For this regulation, normally, the direct current voltage transmitted by the converter is so influenced by variation of the state of magnetization of choke coils, connected in the alternating current supply circuit, at the instant of contact connection that the direct current transmitted by the converter remains constant. The choke coil is then biased with alternating current in such a way that at the instant of contact connection it is biased in the direction of the current flowing through the contact, and at the instant of contact disconnection, counter to this current. By an additional direct-current biasing, the amount of transmitted D.C. voltage can now, as is known, be varied by varying the biasing of the choke at the instant of connection. This, however, renders the performance of the contact converter difficult upon disconnection of the contacts, as the height of the disconnect stage is likewise varied by the state of premagnetization of the choke coil at the instant of disconnection. Thus the disconnect moment will vary according to the direct-current bias causing the regulation of the voltage.

This disadvantage can be eliminated by using rectangle-shaped alternating currents for the premagnetization of the choke coils, using two current-limiting choke coils per contact which function alternately, so that one limits the positive, the other the negative half-wave. The one limiting choke coil is now given an additional winding which carries a current proportional to the difference between actual and theoretical value. The amplitude of the one half-wave can then be varied independently of the other half-wave, so that only the connect intermission varies, while the disconnect intermission remains unchanged. However, this arrangement is complicated by the use of several choke coils and valves.

According to the present invention, it is now proposed to bias the choke coil, as before, by a rectangular alternating current and at the same time by a constant direct current. According to the inventive idea, the direct-current bias now acts counter to the load current and is so adjusted that during the blocking i.e. the disconnecting phase of the contacts, little or no re-magnetization of the choke occurs due to the alternating-current bias. For additional re-magnetization prior to connecting of the contacts, current pulses whose voltage-time area depends on the difference between actual and theoretical value of the transmitted current are then used from a magnetic regulating device.

The inventive concept will become more apparent from the following detailed description of a typical embodiment thereof and from the accompanying drawings in which FIG. 1 is a graph illustrating magnetization of one of the choke coils;

FIG. 2 is a graph illustrating the wave form of a pulse type regulating voltage used in the control;

FIG. 3 is a circuit diagram of a contact converter illustrating one embodiment of the invention;

FIG. 4 is a graph showing variations in the pulse voltage in accordance with different operating conditions of the converter apparatus; and FIG. 5 is a perspective view of one of the components in the circuit of FIG. 3.

The action of the improved regulating device is explained in greater detail in FIG. 1. In it the magnetization curve of the choke coil is represented, that is, the dependence of the induction B on the magnetization ampere windings $iw$. According to the selected magnetic material it is, in the ideal case, a parallelogram. It is excited by the rectangle-shaped bias $iw_w$ and the D.C. bias $iw_g$ in such a way that the hysteresis curve must be run through to the current reversal in the converter contact before moment A is reached. On the other hand, it is achieved by the D.C. bias that the D.C. bias in the positive half-wave goes only to point C. Therefore, in the course of one cycle, only a small portion is re-magnetized in the positive half-wave. For the voltage regulation there then remains available the induction variation from point C to point E. The D.C. bias can thus adjust the regulation range by displacement of point C. The maximum of the regulation range is given by points B and E. The bias is plotted as a function of time below the magnetization curve. The regulation is obtained by voltage pulses which are generated in a magnetic regulating device. The pulse form is represented in FIG. 2, namely, the pulse voltage $u$ as a function of the time $t$. Its voltage-time area is proportional to the difference between the theoretical and actual value of the current. The pulses bring it about that the re-magnetization goes from point C to point D and stops there until the respective converter contact has closed and the contact current completes the magnetic reversal itself. The length of the connect stage can be regulated in simple manner in this way without influencing the height of the disconnect stage. The magnetic regulating device may then be connected in known manner, for example in saturation angle connection. Or it may be designed so that it is not only influenced by direct current of the contact converter in known manner, namely, directly or with insertion of current transformers, but that two cores are used whose series-connected operating windings are connected to an auxiliary transformer fed from the alternating current mains. In addition there is a direct current winding with which the theoretical value can be adjusted. The theoretical as well as the actual value act on the regulator in magnetically opposite sense. The operating winding of the regulator influences the choke coil through a special regulating winding. This circuit is so connected that the choke coil winding is connected through rectifiers between the center of both operating windings of the regulator and the center of the secondary winding of an auxiliary transformer. This arrangement has the advantage that only few rectifiers are needed for a satisfactory rectification. Three rectifiers are sufficient, the wiring being equivalent to the function of a six-phase wiring.

The complete circuit diagram for the improved contact converter and its regulating apparatus are shown in FIG. 3. The main transformer which supplies alternating current to be converted into direct current is indicated at 1. The primary windings $1a$ of transformer 1 are connected respectively to the phases R, S and T of the alternating current supply mains 2 and the secondary windings $1b$ of this transformer are connected through the six regulating chokes 3 to the six sets of contacts 4 which are arranged to be actuated by known means, not illustrated, to closed and open positions in synchronism with the cyclic change in the alternating voltage in the supply mains 2. The direct current line to which the load is connected is indicated by conductors 5 and the synchronously operating contacts 4 are connected to the direct current load conductors 5.

Each of the six chokes 3 is provided with a direct current biasing winding 6, an alternating current biasing winding 7 and a regulating winding 8. The direct current biasing windings 6 are connected in series and receive their direct current from an auxiliary source of direct current represented by the conductors 9, there being a choke coil 10 and a regulating resistor 11 connected in the supply circuit for the windings 6. The choke coil 10 serves to neutralize the direct current from any alternating current voltages induced in the windings.

The alternating current biasing windings 7 receive their energization from the appropriate phases of the alternating current supply mains 2, and current limiting devices 12 with windings 13 are connected in the energizing circuits for windings 7 in order to change the sinusoidal wave form of the supply mains 2 to one having a rectangular configuration. The current limiting devices 12 are each also provided with a winding 14, the latter being connected in series and supplied with direct current from the auxiliary source, conductors 9, through a regulating resistor 15.

The special magnetic regulators in accordance with the invention are shown at 16, there being one of these regulators for each phase of the alternating current supply mains 2. Each of these regulators is associated with the direct current output from the load side of the converting contactors 4 so as to be influenced by the magnitude of the direct current output. However, the regulators 16 have no special windings fed by the direct current load. Rather the magnetic cores of the regulators 16 are pushed directly over the bus bar which carries the direct current as shown in FIG. 5. The bus bar itself thus serves as a "winding" of the regulator and its function is to provide a control factor dependent upon the actual value of the direct current. The control factor dependent upon, i.e. related to, the theoretical value of direct current is obtained by means of a winding 17 on each of the three regulators 16. The three windings 17 are connected in series and energized by connection to the auxiliary source 9 of direct current through a blocking choke coil 18 and an adjustable resistance 19.

Each of the regulators 16 is also provided with an operating winding consisting of two winding parts 20 and 20' which are associated with different cores. The operating circuit in which these windings 20, 20' are contained, is supplied from the secondary 21b an auxiliary transformer 21, the primary 21a of this transformer being connected to the three phase alternating current supply mains 2. The regulating windings 8 on the chokes 3 for each phase are connected between the center of the two winding parts 20, 20' of one of the regulators 16 and the center of the secondary 21b of the auxiliary transformer 21 through adjustable resistances 22 and rectifiers 23. For this connection, three rectifiers 23 are required, although it represents a six-phase connection. Also, included in the connections to the regulating windings 8 is a circuit breaker 24 which can be operated by means of a relay to cut off the circuit in the event that trouble occurs.

In accordance with the operation of the device, pulses are generated when the actual value of the direct current supplied to the load deviates from the theoretical value sought to be maintained. For the theoretical value there corresponds a magnetic circulation $\theta s$, for the actual value a circulation $\theta i$. As shown in FIG. 4, the pulse voltage $u$ which is supplied to the regulating windings 8 of the chokes 3 increases with an increase in the difference between $\theta s$ and $\theta i$. Accordingly, at too small a value of the direct current, i.e. at too small a value $\theta i$, there occurs an increase in the regulating voltage pulses and hence also in the transmitted direct current voltage, so that the same current of the transformer is forced to the theoretical value. When the actual and theoretical values are in agreement, the circulation has a mean value of $\theta i$.

I claim:

1. Apparatus for automatically regulating the direct current output from a converter of the contact type including chokes in the contact circuits, said chokes including a main winding through which the load current flows, a biasing coil supplied with an alternating current having a rectangular wave form, a second biasing coil supplied with direct current and a regulating winding, said direct current bias acting counter to the load current and being so adjusted that during the disconnecting phase of the contacts at most only a slight re-magnetization of the chokes occurs, and means for further re-magnetizing said chokes prior to connecting of the contacts comprising a magnetic regulating device producing voltage pulses whose voltage-time area depends upon the difference between the actual and theoretical values of the direct current output from the converter and circuit means applying said voltage pulses to said regulating winding.

2. Apparatus as defined in claim 1 characterized in that said magnetic regulating device is influenced directly by the direct current output from the converter and comprises two cores having series connected operating windings thereon connected to the secondary of an auxiliary transformer, said cores being magnetized in opposite senses by the actual and theoretical values of the direct current output, the regulating windings of said chokes being connected through rectifiers between the center of the two operating windings and the center of the secondary of said auxiliary transformer.

3. Apparatus as defined in claim 2 wherein the cores of said regulating device are pushed over the direct current bus bar through which passes the direct current output from the converter.

References Cited in the file of this patent
UNITED STATES PATENTS

| 2,680,831 | Belamin | June 8, 1954 |
| 2,756,381 | Rolf | July 24, 1956 |
| 2,782,359 | Koppelmann | Feb. 19, 1957 |
| 2,883,601 | Kliesch | Apr. 21, 1959 |

FOREIGN PATENTS

| 506,015 | England | May 22, 1939 |